United States Patent
Mori (10) Patent No.: US 8,491,048 B2
(45) Date of Patent: Jul. 23, 2013

(54) VEHICLE BODY STRUCTURE

(75) Inventor: Takeo Mori, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/142,993

(22) PCT Filed: May 13, 2009

(86) PCT No.: PCT/JP2009/058925
§ 371 (c)(1),
(2), (4) Date: Jun. 30, 2011

(87) PCT Pub. No.: WO2010/131343
PCT Pub. Date: Nov. 18, 2010

(65) Prior Publication Data
US 2012/0038187 A1 Feb. 16, 2012

(51) Int. Cl.
*B62D 25/20* (2006.01)
(52) U.S. Cl.
USPC .................................. 296/193.07; 296/204
(58) Field of Classification Search
USPC ............ 296/193.07, 193.06, 193.05, 187.12; 280/784, 127.109, 781, 795, 793, 788
See application file for complete search history.

(56) References Cited

U.S. PATENT DOCUMENTS

| 2,370,211 | A | * | 2/1945 | Ulrich | 296/203.03 |
| 4,572,571 | A | * | 2/1986 | Malen | 296/193.07 |
| 5,611,593 | A | * | 3/1997 | Fukagawa et al. | 296/204 |
| 5,921,618 | A | * | 7/1999 | Mori et al. | 296/187.12 |
| 6,129,412 | A | * | 10/2000 | Tanuma | 296/204 |
| 6,604,781 | B2 | * | 8/2003 | Uchida | 296/204 |
| 7,195,306 | B2 | * | 3/2007 | Egawa et al. | 296/187.08 |
| 7,270,369 | B2 | * | 9/2007 | Okana et al. | 296/204 |
| 7,310,878 | B2 | * | 12/2007 | Chernoff et al. | 29/897.2 |
| 7,637,561 | B2 | * | 12/2009 | Egawa et al. | 296/193.07 |
| 2006/0232105 | A1 | | 10/2006 | Egawa et al. | |

FOREIGN PATENT DOCUMENTS

| JP | A-2006-297966 | 11/1996 |
| JP | A-2004-284576 | 10/2004 |
| JP | A-2006-224909 | 8/2006 |
| JP | A-2007-83868 | 4/2007 |

OTHER PUBLICATIONS

Dec. 8, 2011 International Preliminary Report on Patentability issued in International Application No. PCT/JP2009/058925 (with translation).

International Search Report mailed Aug. 25, 2009 issued in International Patent Application No. PCT/JP2009/058925 (with translation).

* cited by examiner

*Primary Examiner* — Glenn Dayoan
*Assistant Examiner* — Sunsurraye Westbrook
(74) *Attorney, Agent, or Firm* — Oliff & Berridge, PLC (57) ABSTRACT

A vehicle body structure which is subject to a small deformation amount at the time of offset collision and a large deformation amount at the time of full-wrap collision. A floor panel includes a groove which extends from a flat portion to a lower dash panel in the longitudinal direction of the vehicle, and an upper floor member having an approximate U-shaped cross-section is accommodated inside the groove, so that a closed cross-section is formed. The upper floor member and the flat portion of the floor panel are connected to each other by being respectively welded to brackets. A floor cross member extending in the width direction of the vehicle is fixed to the flat portion across the groove.

12 Claims, 9 Drawing Sheets

VEHICLE BODY STRUCTURE

TECHNICAL FIELD

The present invention relates to a vehicle body structure, and particularly, to a vehicle body structure around a floor panel constituting a floor of a vehicle.

BACKGROUND ART

In order to improve the rigidity of a vehicle body of an automobile, there is known a vehicle body structure in which a floor member is installed on a floor panel constituting a floor of an interior of a vehicle to extend in the longitudinal direction of the vehicle and the floor panel and the floor member form a closed cross-section. In the technique disclosed in PTL 1, a recess (a groove) is formed in the floor panel to extend in the longitudinal direction, and a floor member is accommodated inside the groove to suppress a step portion from being formed on the floor of the interior of a vehicle. A rear end of the floor member is fixed to a cross member extending in the width direction of the vehicle for the reinforcement thereof.

CITATION LIST

Patent Literature

[PTL 1] JP-2007-83868A

SUMMARY OF INVENTION

Technical Problem

When the rigidity improves in this manner, a passenger may be protected by suppressing a deformation of the interior of the vehicle at the time of offset collision. On the other hand, since the collision area between vehicle bodies at the time of full-wrap collision becomes wider than that at the time of offset collision, if the deformation amount with respect to the load is the same, the deceleration of the vehicle increase. For this reason, there is a need to increase the deformation portion at the time of full-wrap collision, and in the past, a solution to this problem lied in changing the vehicle package.

Therefore, it is an object of the invention is to provide a vehicle body structure which is subject to a small deformation amount at the time of offset collision and a large deformation amount at the time of full-wrap collision.

Solution to Problem

In order to solve the above-described problem, a vehicle body structure according to the invention includes: a floor panel which constitutes a floor of an interior of a vehicle; and a floor member which extends in the longitudinal direction of the vehicle, wherein the floor panel and the floor member form a closed cross-section in a cross-section perpendicular to the extension direction, and wherein the vehicle body structure further includes a bracket which connects the floor member and the floor panel to each other.

The vehicle body structure may further include: a floor cross member which extends in the width direction of the vehicle and is fixed to the floor panel across the floor member. The vehicle body structure may further include: a second floor member which extends in the longitudinal direction of the vehicle at the opposite side of the floor member with the floor panel interposed therebetween and forms a closed cross-section common to a part of the closed cross-section formed by the floor panel and the floor member. The floor panel may include a recess which extends in the longitudinal direction of the vehicle, and the floor member may be accommodated in the recess. The bracket may separate the connection between the floor member and the floor panel when a predetermined amount or more of load is applied thereto in the longitudinal direction.

Advantageous Effects of Invention

Since the floor member and the floor panel form a closed cross-section and the closed cross-section extends in the longitudinal direction, the rigidity of the floor of the interior of the vehicle may improve, whereby the deformation of the interior of the vehicle at the time of offset collision may be effectively suppressed. Since the bracket connecting them to each other is separated at the time of full-wrap collision, the rigidity of the entire floor is degraded, so that the deformation of the floor panel is permitted. For this reason, it is possible to decrease the deceleration of the vehicle and lessen an impact with respect to the passenger.

DESCRIPTION OF EMBODIMENTS

Hereinafter, an exemplary embodiment of the invention will be described in detail by referring to the accompanying drawings. For convenience of description, the same reference signs will be given to the same components in the drawings, and the repetitive description thereof will be omitted.

Figure 1:
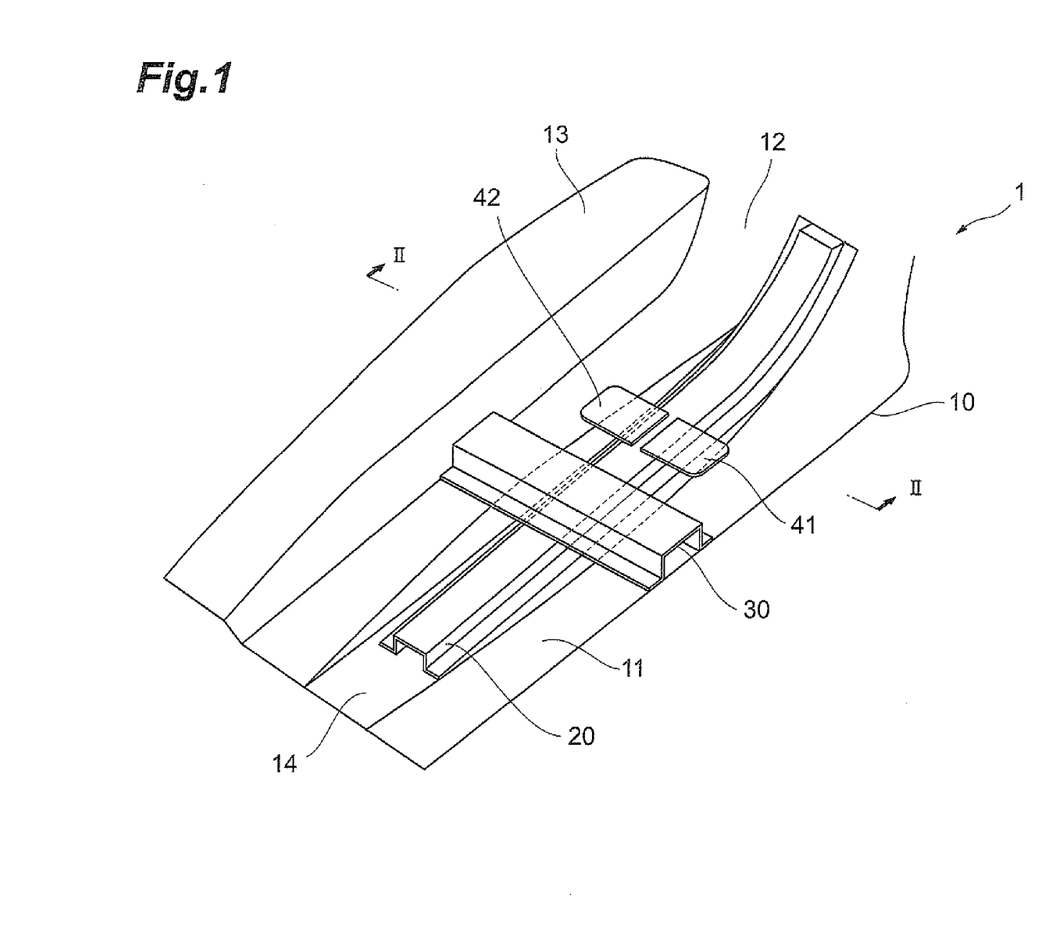
FIG. 1 shows a perspective view illustrating a vehicle body structure according to the invention.
Figure 2:
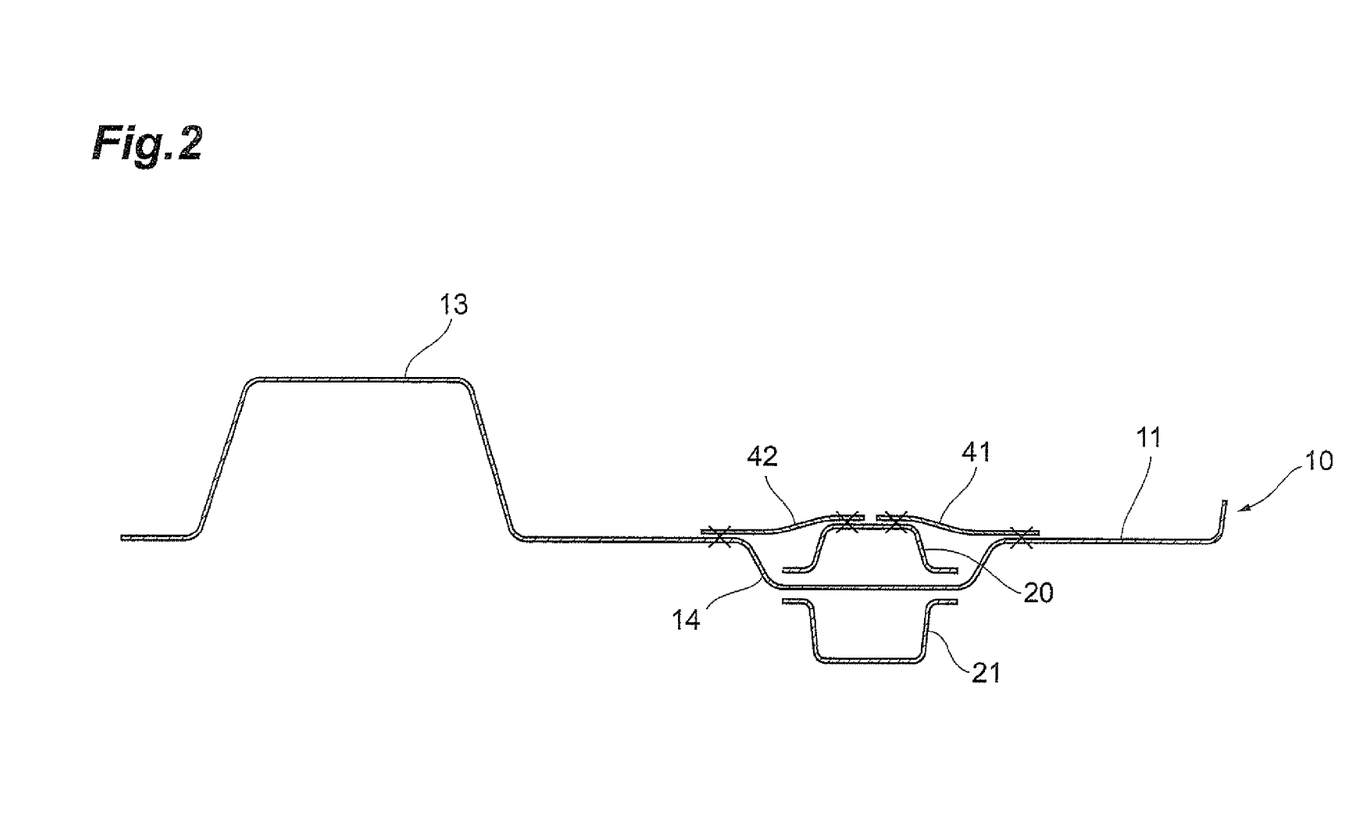
FIG. 2 shows a cross-sectional view taken along the line II-II of FIG. 1.

FIG. 1 is a perspective view illustrating the structure of a vehicle body structure according to the invention, and FIG. 2 is a cross-sectional view taken along the line II-II thereof. A vehicle body structure 1 according to the invention includes a floor panel 10 which forms a floor of an interior of a vehicle. The floor panel 10 is, for example, a sheet-like member made of a metal sheet, and includes left and right flat portions 11 (in the drawing, only the right portion is shown, the left portion is not shown) which form the floor, a lower dash panel 12 which is lifted upward at the front portion thereof, and a floor tunnel portion 13 which projects toward the interior of the vehicle in the longitudinal direction of the vehicle and has an approximate U-shaped cross-section. A groove (a recess) 14 is formed in the longitudinal direction of the vehicle around the center of the width direction of the vehicle from each flat portion 11 to the lower dash panel 12.

An upper floor member 20 is accommodated inside the groove 14 to extend in the extension direction of the groove 14. The upper floor member 20 has an approximate U-shaped cross-section, and is accommodated while the opening end surface thereof faces the bottom surface of the groove 14, so that a closed cross-section is formed by the bottom surface of the groove 14 and the U-shaped portion of the upper floor member 20. The upper surface of the upper floor member 20 and the flat portion 11 of the floor panel 10 are connected to each other while being respectively welded to sheet-like brackets 41 and 42 (in FIG. 2, the welding position is depicted by the mark X).

An under floor member 21 is disposed at a position symmetrically opposite to the upper floor member 20 of the lower portion of the groove 14 of the floor panel 10 so that it extends in the extension direction of the groove 14 and has an approximate U-shaped cross-section. As a result, the bottom surface of the groove 14 and the U-shaped portion of the under floor member 21 form a closed cross-section.

A floor cross member 30 is disposed on the flat portion 11 of the floor panel 10 located at the rear side of the vehicle in relation to the brackets 41 and 42 to extend in the width direction of the vehicle. The floor cross member 30 also has an approximate U-shaped cross-section, and the opening end surface thereof is fixed while being disposed to face the flat portion 11. As a result, the floor cross member 30 is disposed in a manner of crossing the groove 14 and the upper floor member 20 accommodated therein. Then, a gap is provided between the floor cross member 30 and the upper floor member 20, and both are not connected to each other.

In the vehicle body structure 1 of this embodiment, since the rigidity of the vehicle body structure improves due to the closed cross-section formed by the upper floor member 20, the under floor member 21, and the floor panel 10, the deformation of the interior of the vehicle may be effectively suppressed at the time of offset collision.

Figure 3:
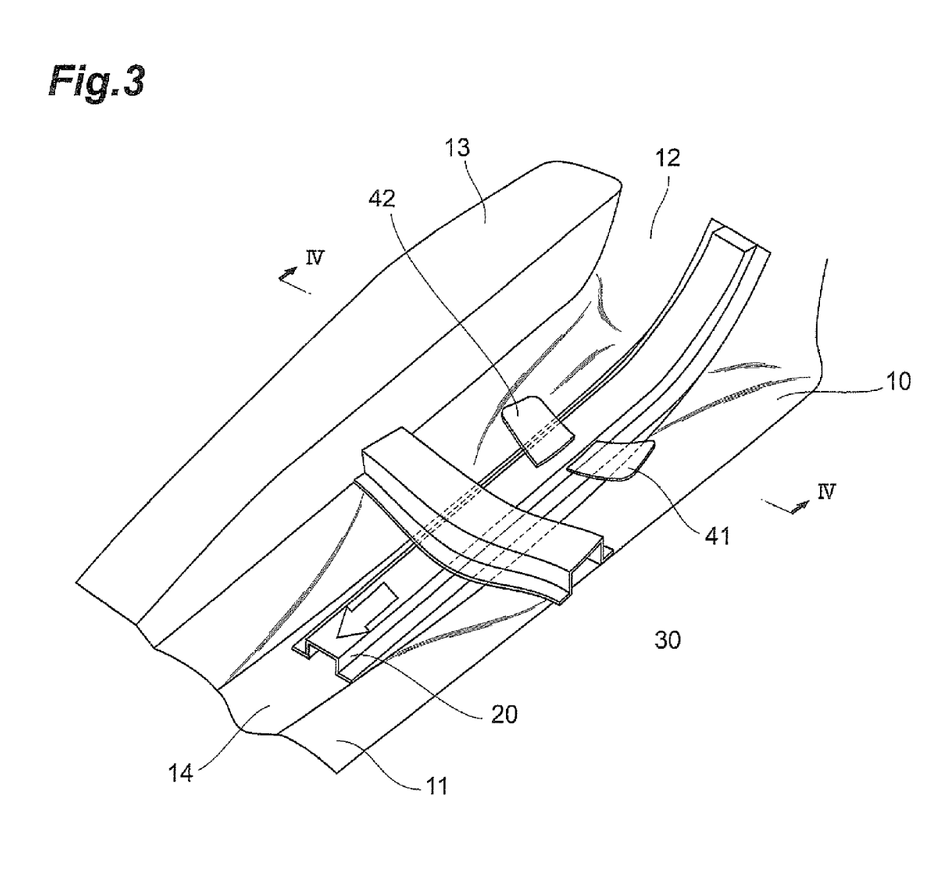
FIG. 3 shows a perspective view illustrating a deformation state of the structure of FIG. 1 at the time of full-wrap collision.
Figure 4:
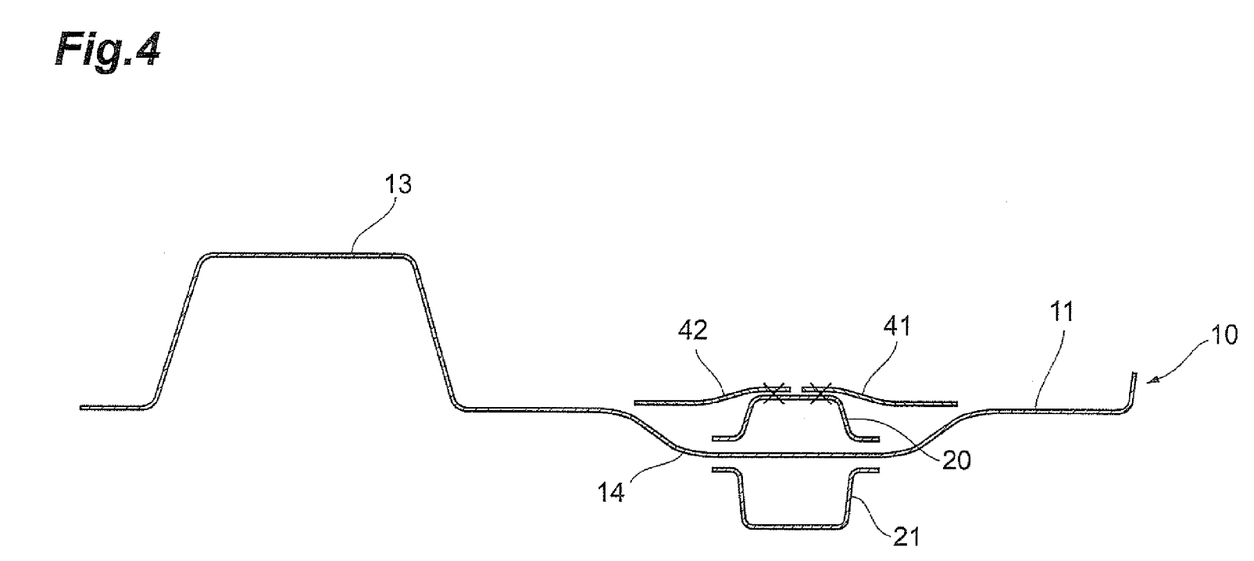
FIG. 4 shows a cross-sectional view taken along the line IV-IV of FIG. 3.

On the other hand, collision energy is absorbed by actively deforming the floor panel 10 at the time of full-wrap collision. The deformation state at the time of full-wrap collision is shown in FIGS. 3 and 4. In this embodiment, the strength of the welding positions between the brackets 41 and 42 and the upper floor member 20 or the flat portion 11 with respect to a load in the longitudinal direction of the vehicle is set to be larger than a load expected at the time of offset collision and be smaller than a load expected at the time of full-wrap collision.

As a result, since the welding portions between the brackets 41 and 42 and the upper floor member 20 or the flat portion 11 are separated due to breakage or the like at the time of full-wrap collision, the connection between the upper floor member 20 and the flat portion 11 is released, so that the upper floor member 20 moves backward inside the groove 14. At this time, since the floor cross member 30 and the upper floor member 20 are not connected to each other, the backward movement of the upper floor member 20 is not disturbed by the floor cross member 30. Accordingly, the rigidity of the floor panel 10 is degraded, and collision energy may be absorbed by the deformation of the vehicle body structure 1 including the floor cross member 30.

Figure 5:
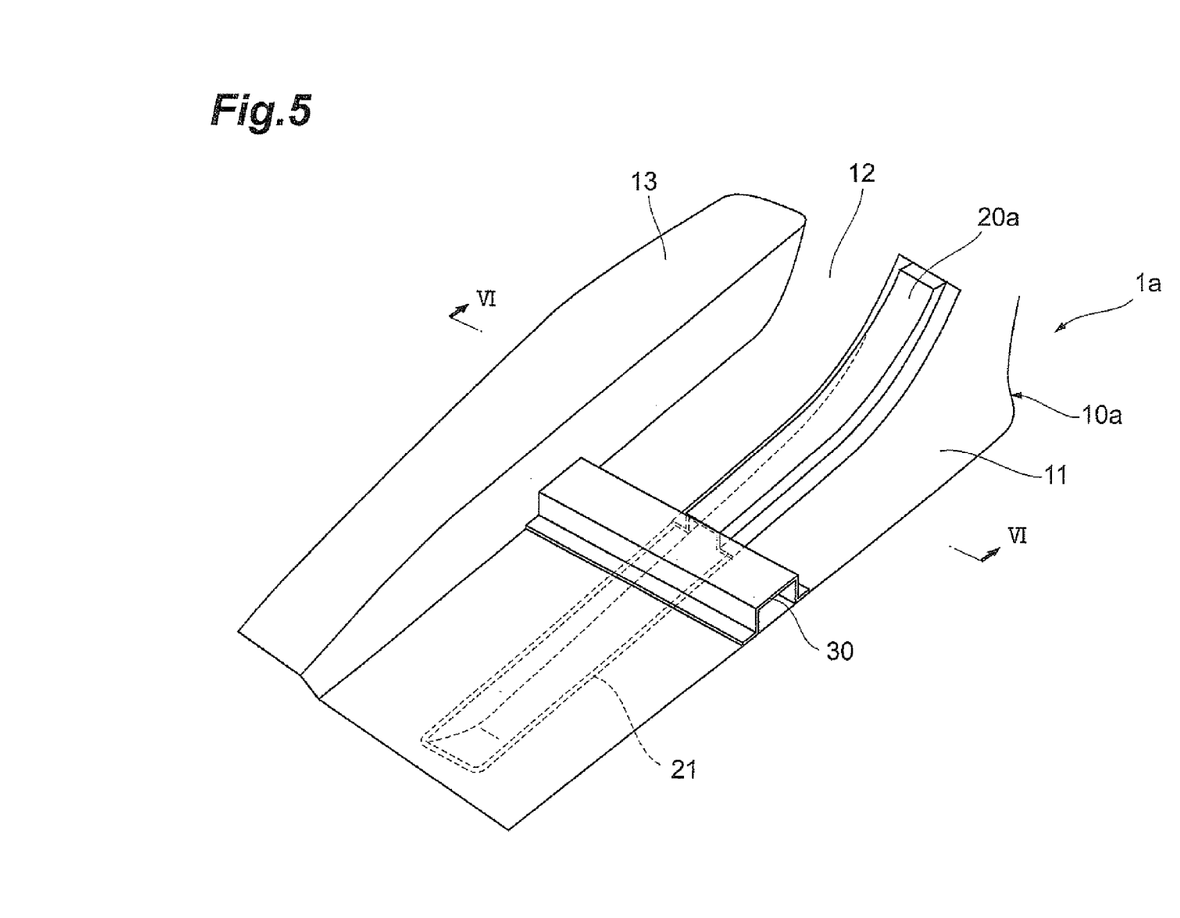
FIG. 5 shows a perspective view illustrating the structure of an existing vehicle body structure.
Figure 6:
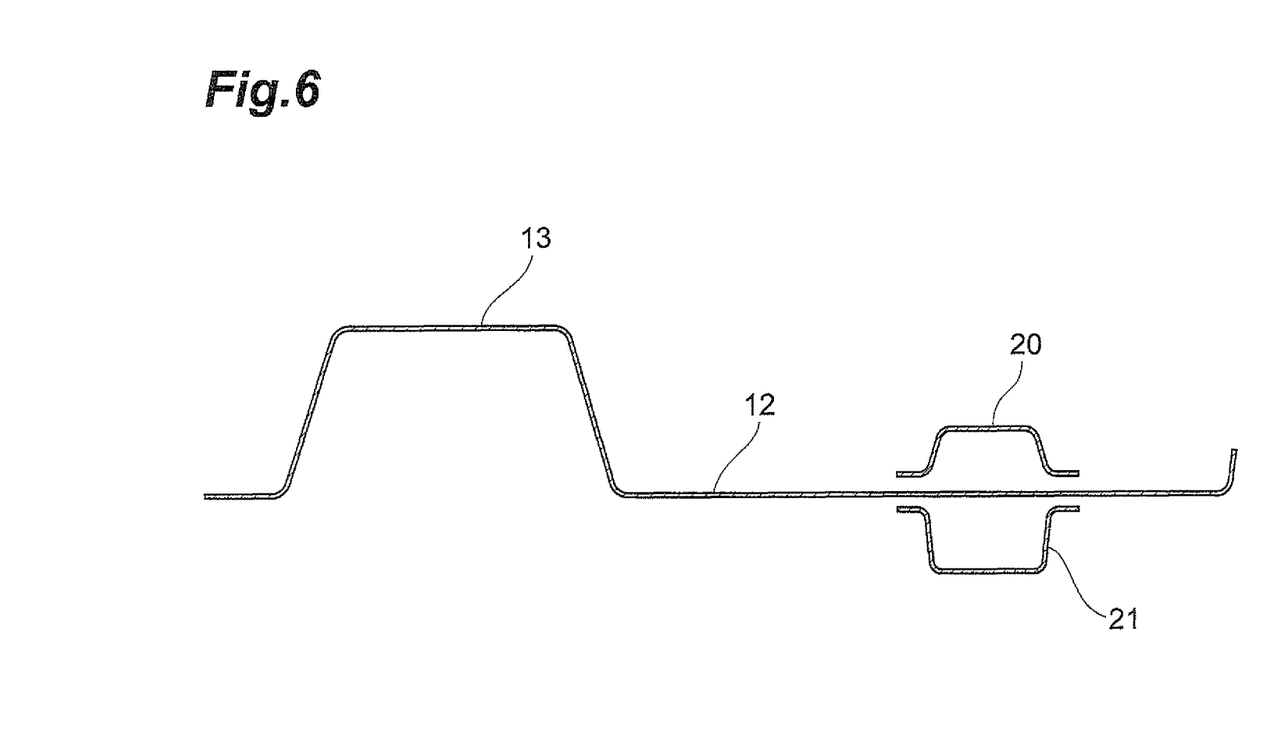
FIG. 6 shows a cross-sectional view taken along the line VI-VI of FIG. 5.
Figure 7:
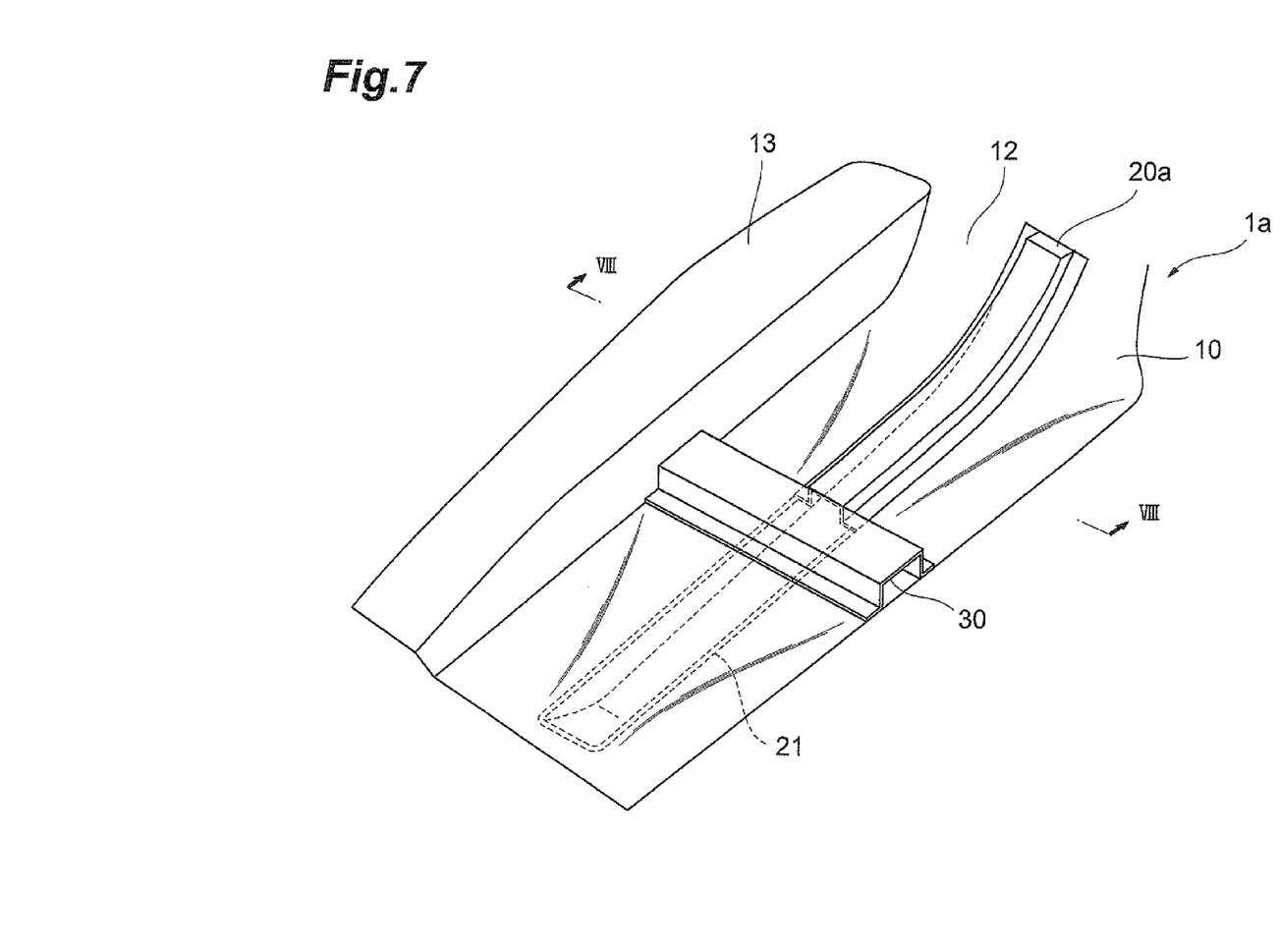
FIG. 7 shows a perspective view illustrating a deformation state of the structure of FIG. 5 at the time of full-wrap collision.
Figure 8:
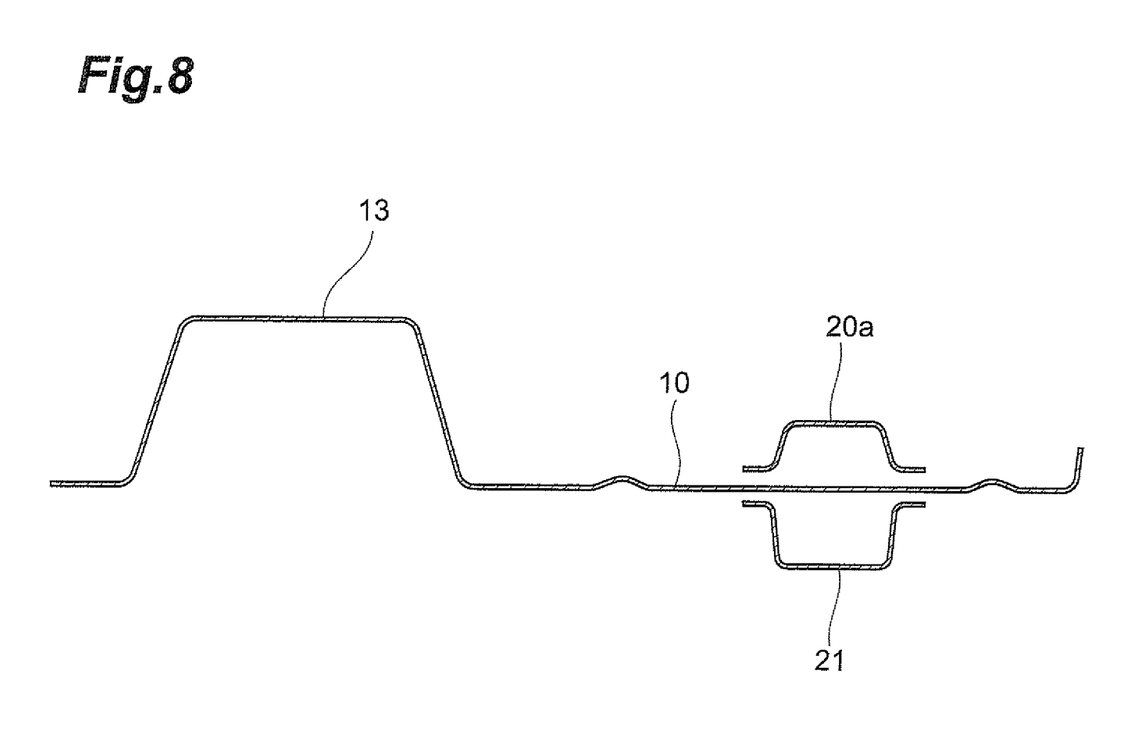
FIG. 8 shows a cross-sectional view taken along the line VIII-VIII of FIG. 7.

For comparison, FIGS. 5 to 8 illustrate a deformation example of the existing structure at the time of full-wrap collision. FIGS. 5 and 7 are perspective views before and after deformation, and FIGS. 6 and 8 are cross-sectional views respectively taken along the lines VI-VI and VIII-VIII and corresponding to FIGS. 1 to 4 of the embodiment.

Although the basic configuration of a floor panel 10a of the existing structure is almost the same as that of the floor panel 10 shown in FIG. 1, a groove 14a is not provided, an upper floor member 20a is attached onto the floor panel 10 from the lower dash panel 12 to the floor cross member 30 of the flat portion 11, and the rear end thereof is fixed by the floor cross member 30.

Since the rigidity of the vehicle body structure 1a may be improved even in this structure, the deformation of the interior of the vehicle may be suppressed at the time of offset collision. However, since the backward movement of the upper floor member 20a is suppressed by the floor cross member 30 at the time of full-wrap collision, the rigidity of the floor panel 10 improves as a whole, and the deformation is suppressed. As a result, the deceleration of the vehicle increases, and compared to this embodiment, collision may be easily transmitted to a passenger.

Figure 9:
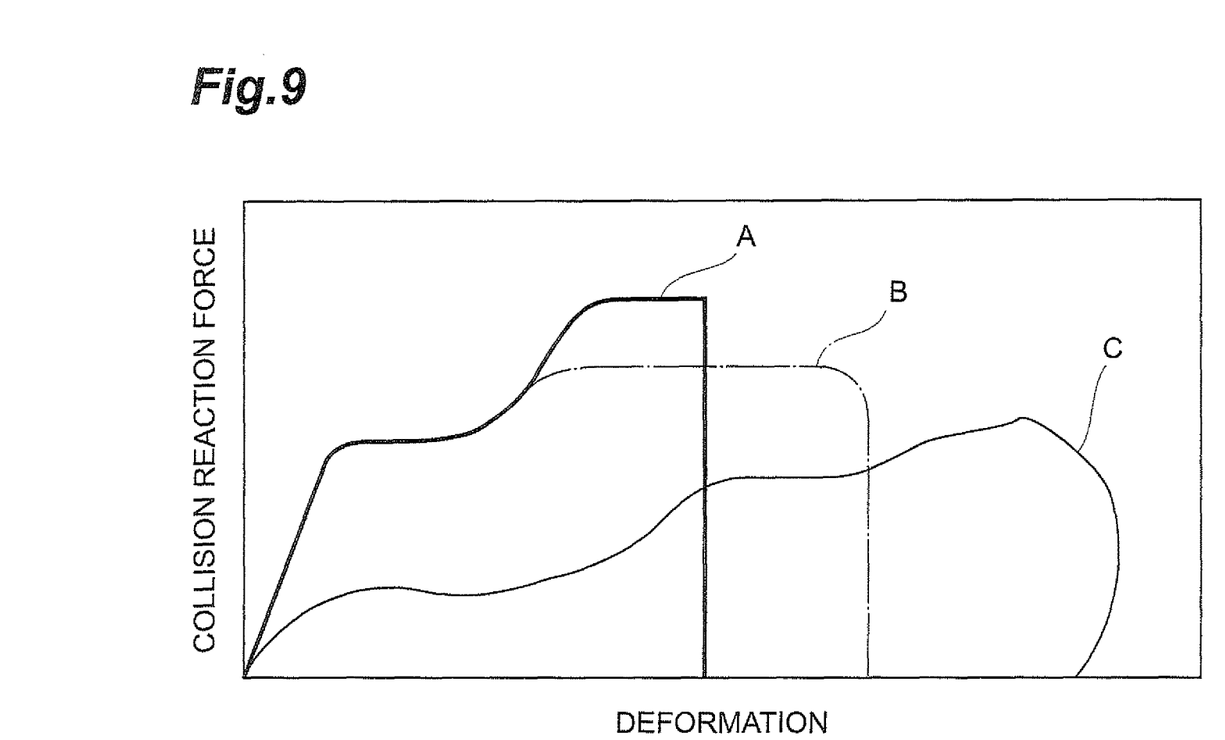
FIG. 9 shows a graph illustrating a characteristic example between load and deformation at the time of collision.

FIG. 9 is a graph comparing load deformation characteristics at the time of offset collision and full-wrap collision between this embodiment and the background art. Since the load deformation characteristic at the time of offset collision is almost the same, only the load deformation characteristic of this embodiment is shown (the line C of the drawing). Regarding the load deformation characteristic at the time of full-wrap collision, the background art is depicted by the line A and this embodiment is depicted by the line B.

Even in this embodiment, the relationship between the reaction force and the deformation amount at the beginning of full-wrap collision is the same as that of the background art until the welding points of the brackets 41 and 42 are broken. In this embodiment, when the welding points of the brackets 41 and 42 are broken due to an increasing reaction force, collision energy is used for deformation from this time, so that the floor panel 10 or the like is deformed without increasing the collision energy. For this reason, the maximum collision reaction force is maintained to be lower than that of the background art. On the other hand, the welding point is not broken due to the collision reaction force at the time of offset collision.

In the embodiment described above, the brackets 41 and 42, the floor panel 10, and the upper floor member 20 are connected to each other by welding, but may be fastened to each other by a bolt, a screw, or the like. Even in this case, it is configured such that the connection is released by the load larger than that at the time of offset collision and smaller than that at the time of full-wrap collision.

Here, an example has been described in which the upper floor member 20 and the under floor member 21 are provided and the upper floor member 20 is accommodated inside the groove 14, but a groove for accommodation thereof may be formed on the under floor member 21. When the member accommodated in the groove is connected to the bracket, it is desirable in that the member easily moves in the longitudinal direction of the groove when the bracket is broken. Further, only one member may be provided. In this case, the member may be connected through the floor panel and the bracket. In the description above, the structure having the cross member has been described, but the cross member need not be provided.

INDUSTRIAL APPLICABILITY

The invention may be also applied to a floor structure of any vehicle other than an automobile.

REFERENCE SIGNS LIST 1, 1a VEHICLE BODY STRUCTURE
10, 10a FLOOR PANEL

11 FLAT PORTION
12 LOWER DASH PANEL
13 FLOOR TUNNEL PORTION
14, 14a GROOVE
20, 20a UPPER FLOOR MEMBER
21 UNDER FLOOR MEMBER
30 FLOOR CROSS MEMBER
41, 42 BRACKET

The invention claimed is:

1. A vehicle body structure comprising:
a floor panel which constitutes a floor of an interior of a vehicle; and
a floor member which extends in the longitudinal direction of the vehicle,
wherein the floor panel and the floor member form a closed cross-section in a cross-section perpendicular to the extension direction, and
wherein the floor member and the floor panel are not bonded to each other at a contact portion of the closed cross-section, and include brackets which connect them to each other at the outside of the closed cross-section near a flat portion of the floor panel.

2. The vehicle body structure according to claim 1, further comprising:
a floor cross member which extends in the width direction of the vehicle and is fixed to the floor panel across the floor member.

3. The vehicle body structure according to claim 1, further comprising:
a second floor member which extends in the longitudinal direction of the vehicle at the opposite side of the floor member with the floor panel interposed therebetween and forms a closed cross-section common to a part of the closed cross-section formed by the floor panel and the floor member.

4. The vehicle body structure according to claim 1, wherein the floor panel includes a recess which extends in the longitudinal direction of the vehicle, and the floor member is accommodated in the recess.

5. The vehicle body structure according to claim 4, wherein the bracket separates the connection between the floor member and the floor panel when a load which is greater than a load expected at the time of offset collision and smaller than a load expected at the time of full-wrap collision is applied thereto in the longitudinal direction.

6. The vehicle body structure according to claim 2, further comprising:
a second floor member which extends in the longitudinal direction of the vehicle at the opposite side of the floor member with the floor panel interposed therebetween and forms a closed cross-section common to a part of the closed cross-section formed by the floor panel and the floor member.

7. The vehicle body structure according to claim 2, wherein the floor panel includes a recess which extends in the longitudinal direction of the vehicle, and the floor member is accommodated in the recess.

8. The vehicle body structure according to claim 3, wherein the floor panel includes a recess which extends in the longitudinal direction of the vehicle, and the floor member is accommodated in the recess.

9. The vehicle body structure according to claim 6, wherein the floor panel includes a recess which extends in the longitudinal direction of the vehicle, and the floor member is accommodated in the recess.

10. The vehicle body structure according to claim 7, wherein the bracket separates the connection between the floor member and the floor panel when a load which is greater than a load expected at the time of offset collision and smaller than a load expected at the time of full-wrap collision is applied thereto in the longitudinal direction.

11. The vehicle body structure according to claim 8, wherein the bracket separates the connection between the floor member and the floor panel when a load which is greater than a load expected at the time of offset collision and smaller than a load expected at the time of full-wrap collision is applied thereto in the longitudinal direction.

12. The vehicle body structure according to claim 9, wherein the bracket separates the connection between the floor member and the floor panel when a load which is greater than a load expected at the time of offset collision and smaller than a load expected at the time of full-wrap collision is applied thereto in the longitudinal direction.

* * * * *